United States Patent [19]

Low et al.

[11] 3,714,526

[45] Jan. 30, 1973

[54] PHOTOTRANSISTOR

[76] Inventors: George M. Low, Acting Administrator of the National Aeronautics and Space Administration with respect to an invention of; David H. McCann, Linthicum, Md.

[22] Filed: Feb. 19, 1971

[21] Appl. No.: 116,777

[52] U.S. Cl......317/235 R, 317/235 N, 317/235 AM, 317/235 UA, 317/235 T
[51] Int. Cl................................................H01l 15/00
[58] Field of Search....317/235 N, 235 AM, 234 UA, 317/235 T

[56] References Cited

UNITED STATES PATENTS 3,244,949  4/1966  Hilbiber...............................317/235
3,546,542  12/1970  Riel et al..............................317/234
3,532,945  10/1970  Weckler...............................317/235

Primary Examiner—Martin H. Edlow
Attorney—L. D. Wofford, Jr., G. J. Porter and John R. Manning

[57] ABSTRACT

The invention described herein was made in the performance of work under a NASA Contract and is subject to the provisions of Section 305 of the National Aeronautics and Space Act of 1958, Public Law 85-568 (72 Stat. 435; 42 U.S.C. 2457).

A phototransistor in which there is included as a part of its integral structure an auxiliary diode in the form of an added base-collector junction which is formed in the surface of the base element and thus out of the direct path between the emitter and collector regions of the phototransistor.

1 Claim, 8 Drawing Figures

PATENTED JAN 30 1973 3,714,526
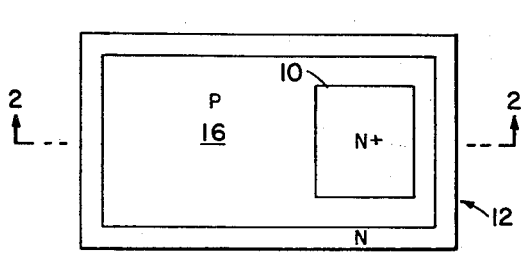
FIG. 1
(PRIOR ART)
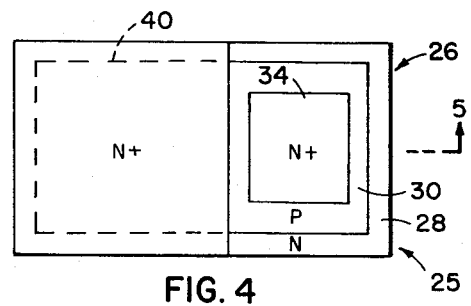
FIG. 4
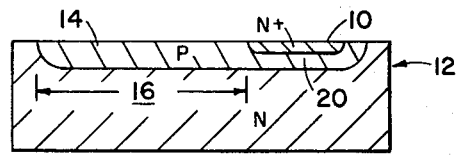
FIG. 2
(PRIOR ART)
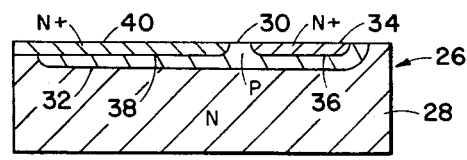
FIG. 5
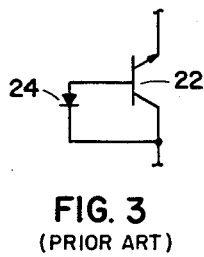
FIG. 3
(PRIOR ART)
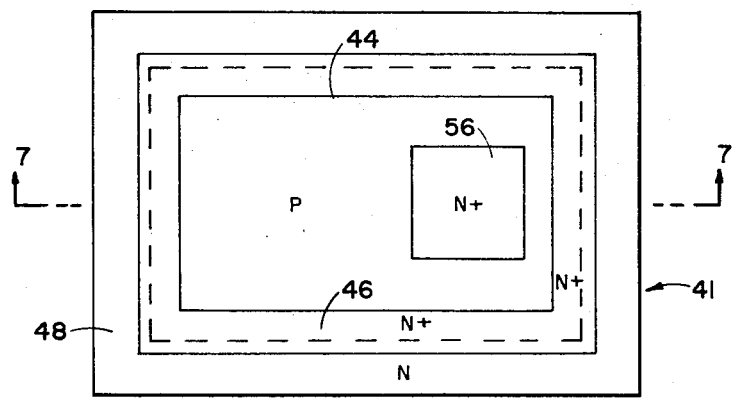
FIG. 6
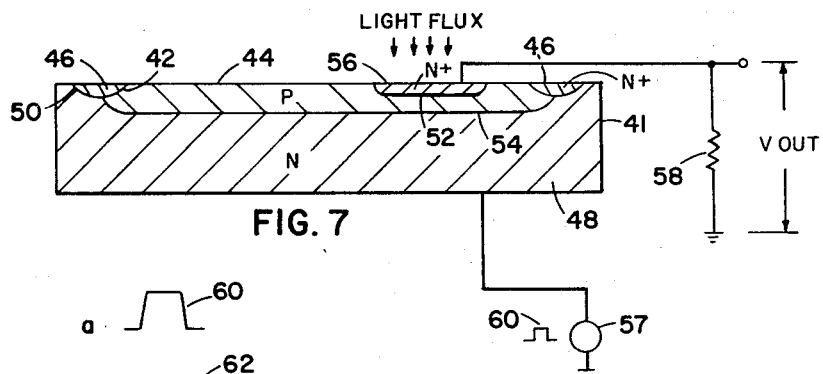
FIG. 7
FIG. 8
David H. McCann,
INVENTOR
BY
George J. Porter
ATTORNEY

PHOTOTRANSISTOR

BACKGROUND OF THE INVENTION

This invention relates to Phototransistors and more specifically to a phototransistor with improved dynamic range when operated in a charge-storage mode.

GENERAL DESCRIPTION OF THE PRIOR ART

A phototransistor or phototransistor sensor essentially consists of a semiconductor comprising emitter, base and collector regions and wherein there are appropriate emitter-base and base-collector junctions separating these regions.

Two alternative readout modes of operation are obtainable with phototransistor sensors: the D.C. or continuous mode and the integration or charge-storage mode. The D.C. mode of operation is the basic mode for continuous operation of a phototransistor whereby photon-generated carriers in or near the base region are beta multiplied, resulting in an output collector current proportional to the instantaneous photon flux on the sensor. When employed in large scale photo-sensor arrays, this mode of operation offers several drawbacks. First, output current is highly dependent on the beta of each phototransistor sensor which, in a large array, might vary significantly from unit to unit, resulting in uneven response. Second, output signal levels for normally encountered light levels are in the microvolt range for reasonably high values of load resistors. Such low-output levels, coupled with an inherently high output impedance, normally requires that some amplification prior to commutation be provided, a distinct disadvantage.

The phototransistor integration or charge-storage mode, a recent development, is a dynamic mode of operation in which a transient output pulse is obtained. This pulse is a measure of the total number of photons incident upon the light sensitive regions during the time between samplings. Between samplings light continuously generates carriers which are stored on the junction capacitances of the phototransistor. Sampling typically consists of detecting the discharge of the collector base junction capacitance through a load resistance. The magnitude of the output transient depends upon the total amount of light-generated charges which were stored since the previous sampling. The output obtained in this manner greatly exceeds that which would be obtained by reading out the static, light-generated photocurrent as per the D.C. mode of operation, which is a function of the light flux on the element only during the sample time.

The dynamic range of operation in the charge-storage mode basically depends for its effectiveness upon the capacitance of the base-collector junction and the maximum voltage at which this junction can be operated. In turn, this maximum operating voltage is limited by the punch-through or breakdown voltage of the base-collector junction.

The maximum base-collector voltage before breakdown is limited to the open-base collector-emitter breakdown of a transistor or phototransistor and this voltage is given by the equation:

$$BV_{CEO} = BV_{CBO}/4 \sqrt{h_{FE}}$$

where $BV_{CEO}$ = collector-emitter breakdown voltage $BV_{CBO}$ = collector-base breakdown voltage $h_{FE}$ = the direct current transistor forward gain This place a severe limit on both the maximum voltage at which known devices may be operated and the maximum base-collector capacitance which can be obtained from them.

Accordingly, it is an object of the present invention to provide an improved phototransistor capable of exhibiting increased base-collector capacitance and thus providing increased dynamic range when operated in a charge-storage mode.

Another object of this invention is to provide a photo-transistor which embodies an auxiliary base-collector diode which increases the overall base-collector capacitance but does not contribute to a reduction in the base-collector breakdown voltage.

BRIEF DESCRIPTION OF THE DRAWINGS

FIG. 1 is a top view of an existing type of phototransistor;

FIG. 2 is a sectional view along lines 2—2 of FIG. 1;

FIG. 3 is an equivalent circuit of the phototransistor shown in FIGS. 1 and 2;

FIG. 4 is a cop view of an embodiment of a phototransistor constructed in accordance with this invention;

FIG. 5 is a sectional view taken along the lines 5—5 of FIG. 4;

FIG. 6 is a top view of an alternate embodiment of the invention;

FIG. 7 is a sectional view along the lines 7—7 of FIG. 6 together with an example of electrical circuitry for operation of the phototransistor in a charge-storage mode; and FIG. 8 is a series of waveforms illustrating operation of a phototransistor in the charge-storage mode.

DESCRIPTION OF EXAMPLE OF PRIOR ART

FIGS. 1–3 illustrate an existing type phototransistor. From an analysis of it, it has been discovered that the breakdown voltage which occurs is controlled not by a general breakdown of the collector-base junction but by a breakdown which occurs only immediately under the emitter of the transistor. That is, for example, the area directly under emitter region 10 of phototransistor 12. Further, it has been determined that increases in this area which might increase capacitance have the effect of lowering breakdown voltage. There is some base area of base region 14, area 16, which is opposite collector region 18 but is not directly under emitter region 10 and which does not, by its expanse, tend to contribute to collector-emitter breakdown and thus breakdown of base-collector junction 20. The equivalent circuit (FIG. 3) may be viewed as an intrinsic phototransistor 22, a phototransistor having equal emitter-base and base-collector junction areas, plus an added reverse-biased parasitic diode 24 is parallel with the base-collector junction of phototransistor 22. Parasitic diode 24 is representative of the junction portion of base-collector junction 20 just opposite base area 16 and the capacitance added by it is not at the expense of a reduced breakdown voltage. As will be appreciated from the configuration of the prior art device shown in FIGS. 1 and 2, the parasitic diode junction area is inherently limited to the horizontal planar area of the device which exceeds the planar area of the base-collector junction directly under the emitter.

BRIEF DESCRIPTION OF THE INVENTION

In accordance with this invention, the difficulties experienced with prior art type phototransistors as to insufficient capacitance, and thus by reduced dynamic range, is overcome by an added base-collector junction which is not in the operational path between the emitter and collector. This added junction area is positioned on a top surface of the base element. In this manner base-collector capacitance is greatly increased without causing a decreased in the emitter-collector breakdown voltage. This then greatly increases the dynamic range of operation of a phototransistor when operated in a charge-storage mode.

DESCRIPTION OF THE PREFERRED EMBODIMENT

Referring now to FIGS. 4 and 5, phototransistor 25 is constructed of a wafer 26 of semiconductor material such as silicon or germanium. The lower and most substantial portion of wafer 26 forms a collector region 28, it being a substrate appropriately doped with impurities to provide an N-type conductivity for an NPN type phototransistor and P-type for a PNP type of phototransistor. Above the collector region is a base region 30 which is formed by the diffusion into the surface of impurities to provide a substrate exhibiting a P-type conductivity for an NPN N-type of phototransistor, N-type for a PNP type of phototransistor. There is thus formed a base-collector semiconductor junction 32 between the base and collector regions which extends over the greater portion of the horizontal cross-section of the device. A third distinct semiconductor substrate or region, emitter region 34, is formed in what otherwise would be the surface of base region 30 and it is the result of appropriate diffusion of impurities to create a N+ conductivity region, (P+ for PNP type phototransistors), that is it has a higher impurity concentration than the N region forming the collector. The emitter region 34 is exposed to receive a light flux as illustrated in FIG. 5 or as also illustrated by emitter region 56 in FIG. 7. With the addition of the emitter region 34 there is created a second junction, emitter junction 36, between the emitter and base regions. Up to this point the construction generally follows the prior art as illustrated in FIGS. 1 and 2. The departure is that of the addition of a second base-collector junction 38 provided by a thin N+ conductivity outer layer 40 as in the case of emitter region 34. As shown in FIG. 5, layer 40 covers a large region of the surface of phototransistor 25 and thus substantially extends the effective base-collector junction area, extending nearly to emitter region 34. Thus, there is achieved a folded configuration which results in a maximum area base-collector junction for the device wherein a large area base region is sandwiched between collector regions. The added layer 40 and junction 38, being near the surface of base region 30 is out of the emitter-collector path, and, as described above, does not materially contribute to base-collector junction breakdown of the device. At the same time, this construction materially increases the base-collector capacitance, a desired feature for phototransistor operation in the charge-storage mode.

FIGS. 6 and 7 illustrate a second type construction for achieving the increased base-collector capacitance. As shown, phototransistor 41 includes an additional base-collector junction 42 which is provided by diffusing into the periphery of base region 44 a supplemental N+ collector region or layer outer 46. This added collector region 46 connects to basic collector region 48 by means of a common peripheral boundary 50. Being out of the path of the emitter-base junction 52 and base-collector junction 54, between emitter region 56 and collector region 48, added base-collector capacitance is obtained without a decrease in maximum base-collector operating voltage.

An example of charge-storage mode of operation of NPN phototransistor 41 is illustrated by the electrical interconnections to phototransistor 41 in FIG. 6 and in FIG. 7 and the wave forms shown in FIG. 8. The base or base region 44 of phototransistor 41 is left floating and pulse source 57 is connected in series with output load resistor 58 between collector 48 and emitter 56, one terminal of pulse source 57 and load resistor 58 being grounded. Pulse source 57 provides a series of pulses 60 which rise from a zero potential to a positive level of operating bias, shown in FIG. 8a. The proportional response or output of the circuit as appearing across load resistor 58 to three different levels of illumination is shown by waveforms 62, 64 and 66 in FIGS. 8b, 8c, and 8d, respectively. A feature of the charge-storage mode of operation is that the peak of the output signal is essentially independent of both the current gain and the area of the transistor.

During the application of a pulse 60 the collector depletion capacitance, as represented by the capacitance of base-collector junctions 42 and 54, charges to a voltage value which is equal to the pulse amplitude voltage less the voltage drops across base emitter junction 52 and output resistor 58, resulting from the illumination ionization current flow produced by an applied light flux. When pulse 60 falls to zero the light flux causes the emitter-base junction to be connected in parallel with the base-collector junctions 42 and 54. Thus the charge across the two base-collector junctions is applied across the base-emitter junction. This then has the effect of causing a reverse bias to be applied across all junctions and a small negative signal to appear across load resistor 58 corresponding in time to the trailing edge of pulse 60. With all junctions reverse biased, and because of the photo-sensitivity of the device, the amount of discharge is proportional to the integral of the illumination ionization current which flows during the period in which the source is grounded. In other words, during the period between pulses, base-collector junctions 42 and 54 are discharged by an amount proportional to the light received between two pulses. Upon the application of the latter of the pulses there is an initial charging current, and thus output positive pulse across resistor 58, of a magnitude proportional to the state of discharge which has been produced by the light flux received between the pulses. For example, waveform 62 in FIG. 8b illustrates an essentially zero received light flux condition, waveform 64 in FIG. 8c illustrates a received light flux of intermediate value, and waveform 66 in FIG. 8d illustrates a received light flux of a fairly large value.

As discussed above, the ability to accommodate larger light values, and thus a wider dynamic range is enhanced by the increased base-collector capacitance provided by the added or auxiliary base-collector junction of this invention. In fact, tests have shown that by the application of a thin diffused layer to form the added junction, layer 40 in FIG. 5 and layer 46 in FIG. 7, increases in base-collector capacitance by a figure of five have been achieved over known previous types of phototransistors.

While two arrangements have been shown for added base-collector junction area in the surface of an otherwise base region of a phototransistor, it is to be appreciated that other configurations are possible depending upon the arrangement of the particular element of a phototransistor. The significant feature is that the added base-collector junction is provided by means of an added collector layer in the surface of the base of the transistor and thus remote from a direct path between the emitter and collector regions.

What is claimed is:

1. A phototransistor comprising:
    a collector element comprising a semiconductor region of a first conductivity type material;
    a base element comprising a semiconductor substrate of a second and opposite conductivity type material integrally formed in a surface of said collector element:
    an emitter element comprising a semiconductor substrate of said first conductivity type material formed in a portion of the surface of said base element and providing an exposed surface adapted to receive a light flux;
    an auxiliary collector element comprising a semiconductor of said first conductivity type of higher concentration than said collector element, said auxiliary element diffused in the principal portion of the otherwise free surface of said base element and said auxiliary element extending into contact with said collector element;
    whereby the effective base-collector junction is extended by a configuration wherein a substantial region of the base of the phototransistor is sandwiched between effective collector regions providing an effective extension of the base-collector regions remote from the path between the emitter and collector of the phototransistor and thereby substantially increasing the collector-base junction capacitance without making the phototransistor more susceptible to emitter-collector breakdown.

* * * * *